United States Patent

Andree et al.

[11] Patent Number: 6,106,608
[45] Date of Patent: Aug. 22, 2000

[54] FLOOR PATCHING AND LEVELING COMPOUND AND ASSOCIATED METHOD

[76] Inventors: Gerd Andree, Im Ardeytal 31, D-58453 Witten; Juergen Bartsch, Zum Steuber 6, D-58313 Herdecke, both of Germany

[21] Appl. No.: 08/999,914

[22] Filed: May 22, 1997

Related U.S. Application Data

[63] Continuation of application No. 08/414,765, Mar. 31, 1995, abandoned.

[51] Int. Cl.$^7$ .............................. C04B 22/10; C04B 24/04
[52] U.S. Cl. ......................... 106/802; 106/695; 106/696; 106/724; 106/728; 106/776; 106/778; 106/810; 106/823; 427/355; 427/397.7; 427/403
[58] Field of Search ..................... 106/810, 695, 106/696, 724, 728, 776, 778, 802, 823; 427/355, 397.7, 403

[56] References Cited

U.S. PATENT DOCUMENTS 4,190,454  2/1980  Yamagisi et al. .................. 106/708

FOREIGN PATENT DOCUMENTS

| 3546003 | 7/1986 | Germany | 106/810 |
|---|---|---|---|
| 53-119922 | 10/1978 | Japan | 106/810 |
| 56-164050 | 12/1981 | Japan | 106/810 |
| 57-027952 | 2/1982 | Japan | 106/810 |
| 57-175766 | 10/1982 | Japan | 106/810 |
| 58-223651 | 12/1983 | Japan | 106/810 |
| 59-156950 | 9/1984 | Japan | 106/810 |
| 2033367 | 5/1980 | United Kingdom | 106/810 |

OTHER PUBLICATIONS

Chemical Abstract No. 103:41628, abstract of Japanese Patent Specification No. 60–42263 (Mar. 1985).

Chemical Abstract No. 105:28862, abstract of German Patent Specification No. 3520300 (May 1986).

Chemical Abstract No. 120:171655, abstract of European Patent Specification No. 579063 (Jan. 1994).

*Primary Examiner*—Anthony Green
*Attorney, Agent, or Firm*—Arnold B. Silverman; Debra Z. Anderson; Eckert Seamans Cherin & Mellott, LLC

[57] ABSTRACT

The present invention provides a floor patching and leveling compound ingredient which provides a desired, smooth finish for a floor surface, the resultant floor and a method of making the same. In a preferred embodiment of the invention, the component includes about by weight of a dispersing agent, about 0.5 to 1.0% by weight of an alkali tartrate, and about 0.8 to 1.3% by weight of an alkali carbonate with this component being employed in the mortar in a proportion of about up to 6% of the mortar on a weight basis.

26 Claims, No Drawings

FLOOR PATCHING AND LEVELING COMPOUND AND ASSOCIATED METHOD

CROSS-REFERENCE TO RELATED APPLICATION

This application is a continuation of Ser. No. 08/414,765, filed Mar. 31, 1995, abandoned.

BACKGROUND OF THE INVENTION

1. Field of the Invention

The present invention relates to a floor patching compound and, more specifically, a leveling component therefor, which will facilitate providing smooth concrete-type surfaces for flooring so as to facilitate providing either a smooth finished floor surface or providing a level substrate for application of other flooring or floor covering materials.

2. Description of the Prior Art

It has long been known to employ various floor patching, leveling, and smoothing compounds in order to smooth uneven areas and to produce horizontal, as well as level surfaces. Such surfaces must, in many cases, be suitable for additional application thereover of floor coverings such as carpeting, tiling, plastic coverings, linoleum, parquet, wood, or other desired materials. Such vinyl floor materials are frequently secured in place by adhesives or bonding mortar. The subflooring to be leveled may be made of concrete, gypsum, anhydrite, metal, or plastic, for example. The subflooring for the floor patching and leveling compound may consist of solid material of loadbearing strength, such as metal, plastic, and cementitious and gypsum-bound concrete, mortar, and floor topping.

Leveling compounds may also be employed to provide uniform sloping surfaces where desired as by establishing a smooth transition between floors of two levels.

It has been known in floor patching, leveling and smoothing compounds to employ hydraulic binders whose binding properties are activated by admixture of the material with water. Among the known binders are portland cements, portland blast furnace slag cements, alumina cements, lime and gypsum. Also, if desired, inert fillers such as sand, chalk or other suitable materials have been employed.

It has also been known to employ in such compositions dispersion powders which are used to facilitate obtaining the desired plasticity required for processing, as well as elasticity.

Among the additives which have been known for such materials are cellulose derivatives which may be employed for obtaining water retention characteristics and to also facilitate even drying and setting of the compounds.

It has also been known to employ accelerators or retarders in combination with hydraulic binders in order to adjust the compounds to the desired working time or setting time, respectively.

In spite of the foregoing known compositions, there remains a problem in the regulation of the rheological properties of this type of compound. The prior materials tend to produce products which are neither self-leveling, nor self-flowing or stable against sedimentation, after they have been mixed with water. As these properties may be critical for successful use of the materials, additives which tend to generate either self-flowing properties such as stability, but do not affect the setting properties of the floor patching, leveling and smoothing compounds, have been employed.

Casein has been known as a material which can assist with regulation of rheological properties of such compounds. Casein, however, is a natural product and as a result may vary substantially in quality. It also can be easily degenerated by micro-organisms, thereby causing unpleasant cheese-like odor which, under certain conditions, may linger for years. As a result, many people are unwilling to employ casein for such purposes.

There remains, therefore, a very real and substantial need for an improved, flowable, floor patching compound having desired leveling properties.

SUMMARY OF THE INVENTION

The present invention has provided a solution to the foregoing problem. More specifically, a floor leveling composition component which provides for desired self-leveling properties when mixed with the mortar has been provided by the present invention.

The floor leveling composition component comprises about 0.2 to 3.0% by weight of a dispersing agent (preferably about 0.8 to 1.3%), about 0.2 to 2.5% by weight of an alkali tartrate (preferably about 0.5 to 1.0%), and about 0.2 to 3.0% by weight of an alkali carbonate (preferably 0.8 to 1.3%) on a total weight of mortar basis and is characterized by exhibiting self-leveling properties when employed in or on a floor.

This component is preferably admixed in a quantity of up to about 6% by weight of the mortar. The mixed materials are then admixed with water to achieve the desired viscosity and applied to the floor. After setting a smooth surface, which may be horizontal or sloping, is provided. If desired, a suitable floor covering may be positioned over the floor with or without securement thereto.

It is an object of the present invention to provide water activated floor mortars or concrete which have the desired self-leveling properties.

It is a further object of the invention to provide such a composition which is water activated and may be applied to a floor substrate using conventional techniques.

It is a further object of the invention to provide such a floor leveling component which does not require the use of casein and which provides desired plasticity and elasticity.

It is a further object of the present invention to provide such a floor leveling composition component which will substantially reduce or eliminate the need to engage in subsequent grinding or sanding to establish a smooth floor.

It is a further object of the invention to provide a technology of establishing such a floor.

It is yet another object of the present invention to provide such a floor leveling composition component which does not significantly alter setting characteristics of the mortar.

These and other objects of the invention will be more fully understood from the following detailed description of the invention.

DESCRIPTION OF THE PREFERRED EMBODIMENTS

While the material of the present invention consists of a leveling component for use in a floor composition which generally will be used as a patching, leveling compound for convenience of reference herein, such materials will be referred generally as the "floor leveling composition component" when referring to the component that contributes the unique properties created by the present invention and as a "floor leveling composition" when referring to the final product which is achieved by admixing the floor leveling composition component with the mortar or other base ingredient with or without the addition of suitable additives. The floor leveling composition will generally be of the type to be admixed with water to achieve the desired viscosity, delivered to the floor, and smoothed as by a trowel, after which setting is permitted.

The mortar employed in the floor leveling composition will generally contain a suitable hydraulic binder composed of one or more binding agents. The following binders are used in the dry mortar: calcium aluminate cement (Fondu Lafarge) about 10–25%; calcium sulphate binder about 2–16%; portland cement about 1–6%. It is preferred that calcined gypsum be employed if a gypsum constituent is used. To this may be added certain inert materials, such as sand or fine chalks, limestone, dusts or sands. These inert fillers are preferably employed in a weight amount of about 1% to 50% of the dry mortar.

Also, if desired, accelerators and retarders, which are known to those in the art, such as chlorides, phosphates, borates, gluconates, and others, may be employed. These accelerators are chlorides and borates, while the retarders are phosphates and gluconates.

The dispersing agent, which may be provided in the form of either a liquid dispersion or a dry dispersion powder produced from such a dispersion, can be employed individually or in combination with other dispersing agents. The dispersing agent can be selected from the group consisting of (a) water soluble polymers of acrylic acid, methacrylic acid, esters of acrylic acid and esters of methacrylic acid, and (b) copolymers of acrylic acid, methacrylic acid acrylamides, acrylnitriles, esters of acrylic acid and esters of methacrylic acid. The weight in relation to dry mortar is as follows:

| Dispersing Agent: | About 0.2–3.0% | (Preferably About 0.8–1.3%) |
| Alkali Tartrate: | About 0.2–2.5% | (Preferably About 0.5–1.0%) |
| Alkali Carbonate: | About 0.2–3.0% | (Preferably About 0.8–1.3%) |

In a preferred embodiment of the invention, the mortar preferably contains at least one resinous dispersing agent selected from the group consisting of (a) polyvinyl acetate, (b) polyvinyl acrylate, (c) methyl acrylate, (d) sodium polyacrylate, (e) copolymers of vinyl acetate with one or more of the following materials, vinyl versatate, ethylene, acrylate, methyl acrylate, vinyl chloride, maleic-acid ester, vinyl laurate, and (f) copolymers of either acrylate or methyl acrylate, or both, with (a) vinyl versatate, ethylene, acrylate, vinyl acetate, vinyl chloride, maleic-acid ester and vinyl laurate.

The preferred alkali tartrates includes at least one material selected from the group consisting of sodium tartrate, potassium tartrate, lithium tartrate, and sodium potassium tartrate. The preferred alkali carbonates include at least one material selected from the group consisting sodium carbonate, potassium carbonate, and lithium carbonate. The most preferred metal alkali carbonate is sodium carbonate.

It has been found that admixing this floor leveling composition component in an amount of up to about 6% of the mortar to produce the floor leveling composition results in a material which has desired self-flowing and self-leveling properties. In creating such a floor, after the composition is applied to the desired areas, they are spread on the surface as by means of a trowel or brushing with a coated blade, for example. Any ridges or trowel marks established by the process disappear by themselves within a few minutes. This self-leveling feature not only produces the desired horizontal or sloped smooth configuration, but also eliminates or reduces the need for any subsequent grinding or sanding to establish uniformity or smoothness. The leveling compound may be applied on any kind of conventional subflooring.

If the amount of dispersing agent or alkali carbonate is reduced to the lower portions of the recited ranges, the viscosity of the floor leveling composition achieved by admixing the component with the mortar and water will increase if the amount of water remains constant. Also, the self-leveling properties of the fresh mortar will tend to be reduced. The water addition should be about 20 to 30% of the mortar weight.

The stability properties of the mortar formulation of the present invention can be enhanced by adding organic or inorganic thickeners, or fiber materials or inert fillers, which are known to those skilled in the art. Examples of such fillers are cellulose derivatives, acrylates, and alkylnitril compounds, all of which may be added to the dry mortar. The filler content of dry mortar may be about 1%–50%. The fillers can be added to the mixture at any time.

EXAMPLE

In order to provide an enhanced understanding of the nature of the invention, an example will be recited. The floor leveling composition containing floor leveling component, prior to admixture with water, has the following composition:

| Material | Weight Percent |
| --- | --- |
| Fondu Lafarge (calcium aluminate cement) | 17.0 |
| Gypsum "Supraduro" (molding plaster) | 4.0 |
| Anhydrite binder AB 20 | 4.0 |
| Chalk | 25.0 |
| Portland Cement | 2.8 |
| Vinyl acetate vinyl versatate copolymer | 2.8 |
| Hydroxyethylene cellulose | 0.3 |
| Vinyl acetate ethylene copolymers | 0.6 |
| Sand smaller than 0.5 mm | 43.5 |

Admixed with this mortar was a dispersing agent which was sodium polyacrylate in the amount of 1.0 weight percent and lithium carbonate in the amount of 1.0 weight percent and sodium carbonate in the percent amount 2.4 weight percent, along with sodium potassium tartrate in the amount of 0.7 weight percent. This ready-mixed mortar was mixed with water with a water-to-solid matter ratio of about 0.21 to 0.23. The resultant mixture had self-flowing properties with ridges and trowel marks avoided when the material was applied in patching an underlying floor made of concrete, floor topping, or other subfloors of loadbearing strength. A reduction of the amount of sodium polyacrylate with the same water/solid matter proportion will produce an increase in mortar viscosity and simultaneously a decrease of self-leveling properties of the freshly mixed mortar. The addition of organic or inorganic fillers or fiber materials such as sepiolite, for example, cause an increase in the stability of the freshly mixed mortar without impairing the self-leveling properties. In addition, mineral glass or synthetic fibers are possible. The fiber content should be in the range of about 1 to 7 weight percent.

It will be appreciated that the present invention has, therefore, provided for a floor leveling composition component that enhances desired self-leveling properties and provides the benefits set forth herein. All of this is accomplished while preserving compatibility with existing materials and procedures. The invention also provides a floor topping provided in this manner and a method of creating the same.

The floor leveling composition of the present invention containing the floor leveling composition component may be used to establish various size and shape patched areas, original floor areas, horizontal sections or angularly positioned sections, and eliminate post-troweling grinding or sanding to establish a smooth surface. After the application of the material in flowable form and effecting of any desired troweling, the material is allowed to set. It may serve as the finished floor or have an overlying floor such as carpeting, tiling, plastic coverings, linoleum, parquet, wood or other desired coverings placed thereover with or without securement thereto.

Whereas particular embodiments of the invention have been described herein for purposes of illustration, it will be evident to those skilled in the art that numerous variations of the details may be made without departing from the invention as set forth in the appended claims.

What is claimed is:

1. A floor leveling composition component admixed with mortar, the composition component comprising about 0.2 to 3.0% by weight of a dispersing agent, about 0.2 to 2.5% by weight of an alkali tartrate and about 0.2 to 3.0% by weight of an alkali carbonate, all said percentages being on a weight basis of the total mortar, and said floor leveling composition component providing self-leveling properties to a floor.

2. The floor leveling composition component of claim 1 wherein said component has about 0.8 to 1.3% by weight of said dispersing agent, about 0.5 to 1.0% by weight of said alkali tartrate, and about 0.8 to 1.3% by weight of said alkali carbonate.

3. The floor leveling composition component of claim 2 wherein said dispersing agent contains at least one member selected from the group consisting of (a) water soluble polymer of acrylic acid, methacrylc acid, esters of acrylic acid and esters of methacrylic acid, and (b) copolymers of acrylic acid, methacrylic acid acrylamides, acrylnitriles, esters of acrylic acid and esters of methacrylic acid.

4. The floor leveling composition component of claim 3 wherein said dispersing agent is sodium polyacrylate.

5. The floor leveling composition component of claim 3 wherein said alkali tartrate is at least one material selected from the group consisting of sodium tartrate, potassium tartrate, lithium tartrate and sodium potassium tartrate.

6. The floor leveling composition component of claim 5 wherein said alkali tartrate is sodium potassium tartrate.

7. The floor leveling composition component of claim 5 wherein said alkali carbonate is at least one material selected from the group consisting of sodium carbonate, potassium carbonate and lithium carbonate.

8. The floor leveling composition component of claim 7 wherein said alkali carbonate is sodium carbonate.

9. A floor having a surface, a floor leveling composition component and mortar, said floor leveling composition component comprising about 0.2 to 3.0% by weight of a dispersing agent, about 0.2 to 2.5% by weight of an alkali tartrate, and about 0.2 to 3.0% by weight of an alkali carbonate, said floor leveling composition component being admixed with mortar and being disposed at or adjacent to said surface of said floor, and said weight percentages of said dispersing agent, said alkali tartrate and said alkali carbonate all being based on the weight in relation to said mortar.

10. The floor of claim 9 wherein said component contains about 0.2 to 3.0% by weight of the dispersing agent, about 0.5 to 1.0% by weight of the alkali tartrate, and about 0.8 to 1.3% by weight of the alkali carbonate.

11. The floor of claim 10 wherein said component is present in an amount of up to about 6% by weight in relation to said mortar.

12. The floor of claim 11 wherein the dispersing agent in said component is at least one material selected from the group consisting of (1) polyvinyl acetate, (2) polyvinyl acrylate, (3) methyl acrylate, (4) sodium polyacrylate, (5) copolymers of vinyl acetate with vinyl versatate, ethylene, acrylate, methyl acrylate, vinyl chloride, maleic-acid ester, or vinyl laurate, and (6) copolymers of either acrylate or methyl acrylate or both with vinyl versatate, ethylene, acrylate, vinyl acetate, vinyl chloride, maleic-acid ester, or vinyl laurate.

13. The floor of claim 12 wherein said dispersing agent is sodium polyacrylate.

14. The floor of claim 13 wherein said alkali tartrate is at least one material selected from the group consisting of sodium tartrate, potassium tartrate, lithium tartrate and sodium potassium tartrate.

15. The floor of claim 14 wherein said alkali tartrate is sodium potassium tartrate.

16. The floor of claim 15 wherein said alkali carbonate is selected from the group consisting of sodium carbonate, potassium carbonate and lithium carbonate.

17. The floor of claim 16 wherein said alkali carbonate is sodium carbonate.

18. A method of establishing a floor comprising providing a floor leveling composition component having about 0.2 to 3.0% by weight of a dispersing agent, about 0.2 to 2.5% by weight of an alkali tartrate, and about 0.2 to 3.0% by weight of an alkali carbonate with the weight being based on mortar weight;

admixing said floor leveling composition component with mortar with said floor leveling composition component being present in an amount of up to about 6% by weight of said mortar;

mixing said admixed mortar and floor leveling composition component with water to provide a component-mortar-water admixture;

applying said component-mortar-water admixture to a subfloor surface, and smoothing said component to provide a floor surface, and allowing said floor surface to set.

19. The method of claim 18 including subsequent to allowing said floor to set applying flooring of a different material from said floor thereover.

20. The method of claim 18 wherein said component contains about 0.8 to 1.3% by weight of said dispersing agent, about 0.5 to 1.0% by weight of the alkali tartrate, and about 0.8 to 1.3% by weight of said alkali carbonate.

21. The method of claim 20 wherein said dispersing agent is at least one material selected from the group consisting of (1) polyvinyl acetate, (2) polyvinyl acrylate, (3) methyl acrylate, (4) sodium polyacrylate, (5) copolymers of vinyl acetate with vinyl versatate, ethylene acrylate, methyl acrylate, vinyl chloride, maleic acid ester, or vinyl laurate, and (6) copolymers of either acrylate, or methyl acrylate or both with vinyl versatate, ethylene, acrylate, vinyl acetate, vinyl chloride, maleic-acid ester, or vinyl laurate.

22. The method of claim 20 including selecting sodium polyacrylate as said dispersing agent.

23. The method of claim 20 including as said alkali tartrate at least one material selected from the group consisting of sodium tartrate, potassium tartrate, lithium tartrate, and sodium potassium tartrate.

24. The method of claim 20 wherein said alkali carbonate is at least one material selected from the group consisting of sodium carbonate, potassium carbonate and lithium carbonate.

25. The method of claim 20 wherein said mortar includes a binder having about 2 to 16% by weight gypsum or anhydrite, about 10 to 25% by weight calcium aluminate cement, and about 1 to 6% by weight portland cement.

26. The method of claim 25 wherein said mortar includes a filler in an amount of about 1 to 50% by weight of said mortar.

* * * * *